INVENTORS:
JOSEPH D. EISLER
CHARLES F. HADLEY
BY Newell Potter
ATTORNEY

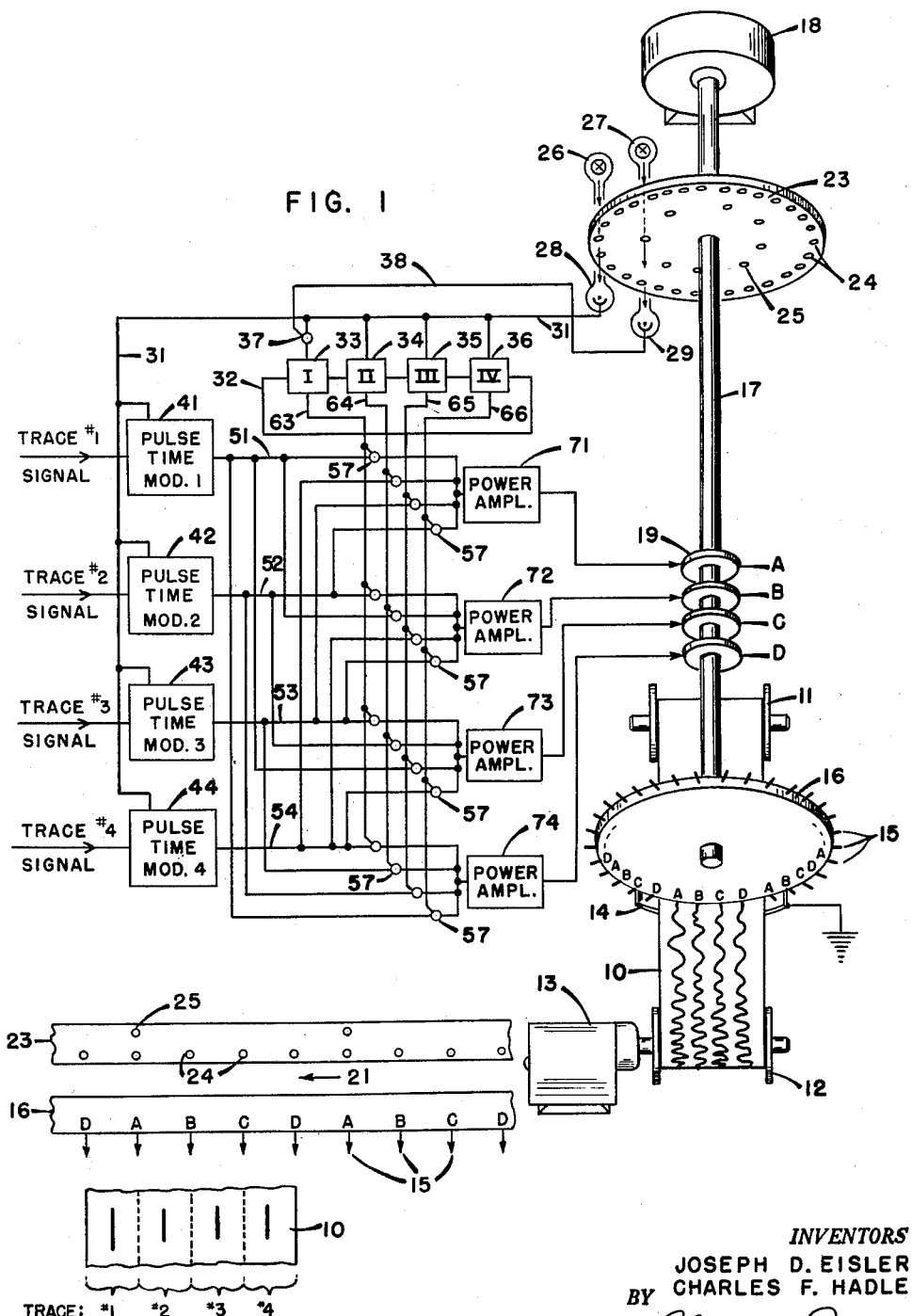

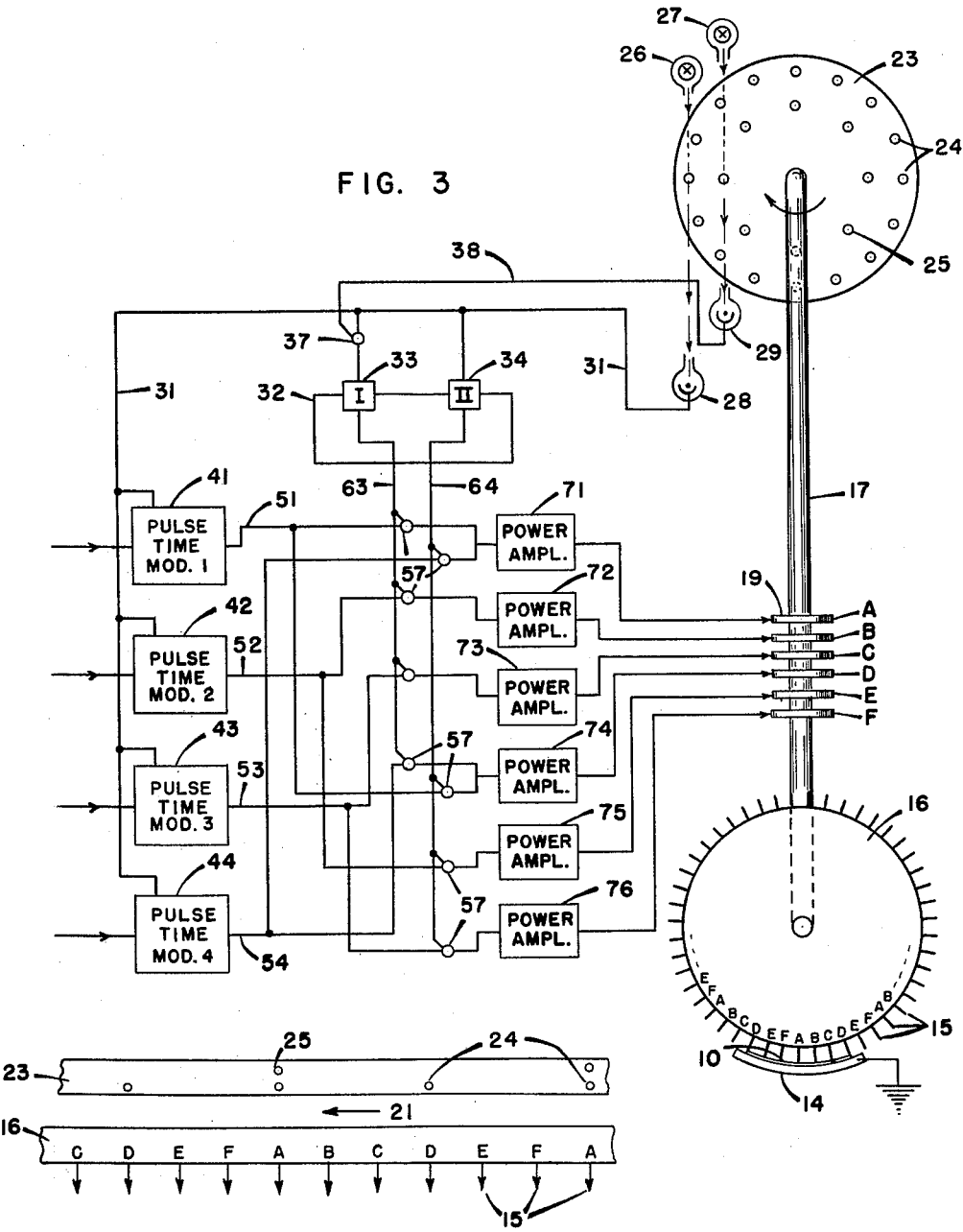

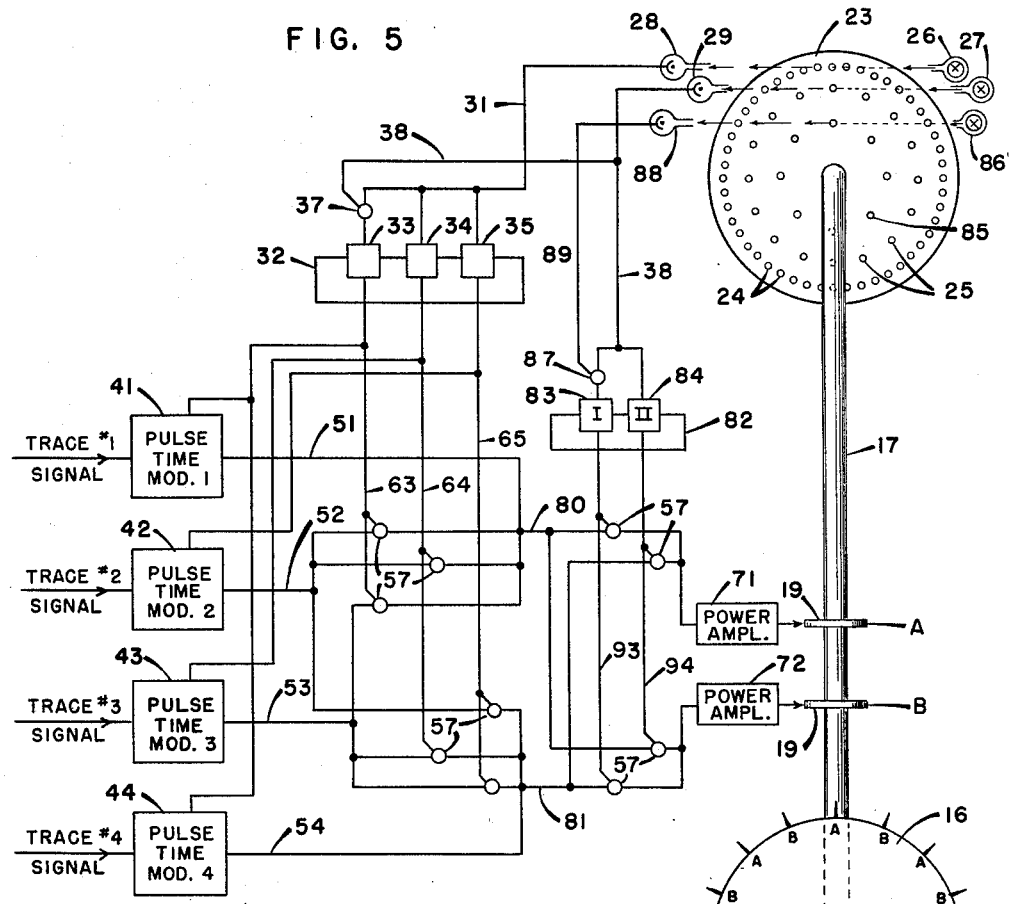
FIG. 5
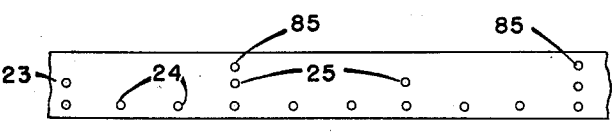
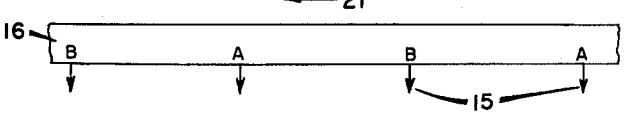
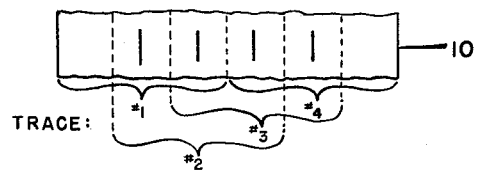
FIG. 6
INVENTORS
JOSEPH D. EISLER
BY CHARLES F. HADLEY
Newell Pottoy
ATTORNEY Oct. 6, 1959     J. D. EISLER ET AL     2,907,621
MULTIPLE-TRACE RECORDER
Filed Dec. 16, 1955     6 Sheets-Sheet 6

United States Patent Office 2,907,621
Patented Oct. 6, 1959

2,907,621

MULTIPLE-TRACE RECORDER

Joseph D. Eisler and Charles F. Hadley, Tulsa, Okla., assignors to Pan American Petroleum Corporation, a corporation of Delaware Application December 16, 1955, Serial No. 553,455

7 Claims. (Cl. 346—74)

This invention relates to multiple-trace recorders and is directed particularly to an inkless recorder for producing visible, multiple-trace records on a non-photographic medium. More specifically, it is directed, but not limited, to the recording of seismograph records on relatively inexpensive, electrically sensitive paper on which the record becomes immediately visible.

This application is a continuation-in-part of our prior application S.N. 422,314, filed April 12, 1954, now abandoned.

Ever since the beginning of the seismic method of geophysical surveying the great majority of multiple-trace, oscillographic seismic records have been made photographically. A few seismic recording systems have been devised to make records in reproducible form, as variable-area or variable-density traces on film, or as traces on a magnetic medium such as tape, but most of these systems require translation of the field record into a visible oscillographic one of photographic or similar type for purposes of analysis and interpretation.

Direct-writing pen records have generally been unable to substitute for photographic recording for the reason that recording pens are unable to respond accurately at the frequencies it is necessary to record. If, in recording from a reproducible record, the speed is reduced to lower the frequency, other problems arise relating to the design of circuits for amplifying and filtering low-frequency signals.

Reproducing the seismic records as a multiple-trace presentation on a television or cathode-ray oscilloscope type of screen introduces complications in providing multiple electron beams or multiplexing a single electron beam so that it can represent a plurality of traces. A further drawback of such visual presentations is that they are temporary rather than permanent in form so that they are primarily useful only for inspection rather than for study and interpretation.

Systems representative of the non-photographic inkless recorder of the type to which the present invention is directed are shown in Patents 2,501,790 and 2,501,791, of Daniel Silverman, and 2,579,852, of R. W. Olson. As regards the speed with which recording may be done, the Silverman system is entirely satisfactory. Due to the use of a comb made up of a large number of individual stationary styli past which the record medium is drawn, however, there is a "quantizing" effect which gives to waves of small amplitude the appearance of square-topped steps rather than oblique lines.

This particular difficulty is overcome in the Olson system in that the record-producing dots provided by Olson's rotating helix can be made to appear at any place across the width of the record material. In general, it can be said that a minimum of 10 to 20 dots per cycle is needed to define a wave form of medium amplitude with reasonable fidelity. For recording seismic waves as received, therefore, this means that it is almost essential that the spacing between adjacent dots be not much more than one millisecond of trace time, and preferably the successive dot spacing should not exceed about one-half millisecond of trace time. If a recording, therefore, is to be made at the same speed as photographic recordings are made during field operations, it means that the helix in the Olson system should rotate at at least 1,000, and preferably at about 2,000, revolutions per second. Needless to say, such high mechanical rotational speeds are hardly practical in a recording apparatus.

Similar considerations apply for recording of waveform signals from other sources than seismic-wave detectors. That is, the fidelity of recording considered necessary and the dot-repetition rate are interrelated in the same way, even though the frequencies are quite different from seismic frequencies. It is desirable to exceed the minimum of 10 to 20 dots per cycle by as large a factor as possible, preferably at least two.

It is accordingly a primary object of our invention to provide a recording system for producing, on electrically sensitive recording paper moving at a speed which is "normal" for field recording, a plurality of traces, by means of styli or contactors which move across the record medium in a continuous manner. A further object is to provide such a recording system in which the recording contactors move at speeds which are high but are entirely feasible in the mechanical sense. A still further object is to provide a recording system of the character indicated wherein a plurality of moving mark-producing contactors are maintained simultaneously in contact with the recording medium, each of said contactors being utilized to produce one or more record-trace-producing dots in any one scanning traverse across the record medium. Other and further objects, uses, and advantages of our invention will become apparent as the description proceeds.

Briefly stated, the foregoing and other objects are accomplished by our invention, and the difficulties of the prior-art systems are avoided, by mounting the record-dot-producing styli or contactors so that they project outwardly from the edge of a disc which is rotated at high speed across a recording-paper strip which is rounded to the same curvature as the arc traced by the stylus tips. The strip is drawn past the recording styli in a direction parallel to the axis of the disc rotation. The spacing of the styli along the edge of the disc is such that a plurality of the styli are simultaneously in contact with the record-receiving medium. Pulses of electrical current pass from the styli through the recording medium to a conducting backing plate at the proper times during the stylus motion to produce on the record medium the trace-producing dots, at the correct positions to indicate the instantaneous trace amplitudes. Multiplexing means between the signal sources and the mark-producing styli switch the trace-producing pulses from each stylus to another stylus at appropriate times during the disc rotation. For high speed operation these multiplexing means are preferably electronic circuits, although commutators can be used, particularly at slower disc speeds.

For some applications the multiplexing circuits can be omitted. This substantially reduces the power requirements and simplifies the electronic circuits, at the expense of some loss of fidelity and response to high frequencies.

This will be more clearly understood by reference to the accompanying drawings forming a part of this application and showing certain illustrative embodiments of the invention. In these drawings, Figure 1 is a view, which is partially diagrammatic and partially in perspective, of the circuits and apparatus for producing a four-trace record;

Figure 2 is a detail drawing showing diagrammatically the relative positions of the recording styli and the record medium at the instant of beginning of a typical recording cycle;

Figures 3 and 4 are diagrammatic views, corresponding respectively to Figures 1 and 2, of an alternative embodiment of the invention permitting trace overlap;

Figure 7:
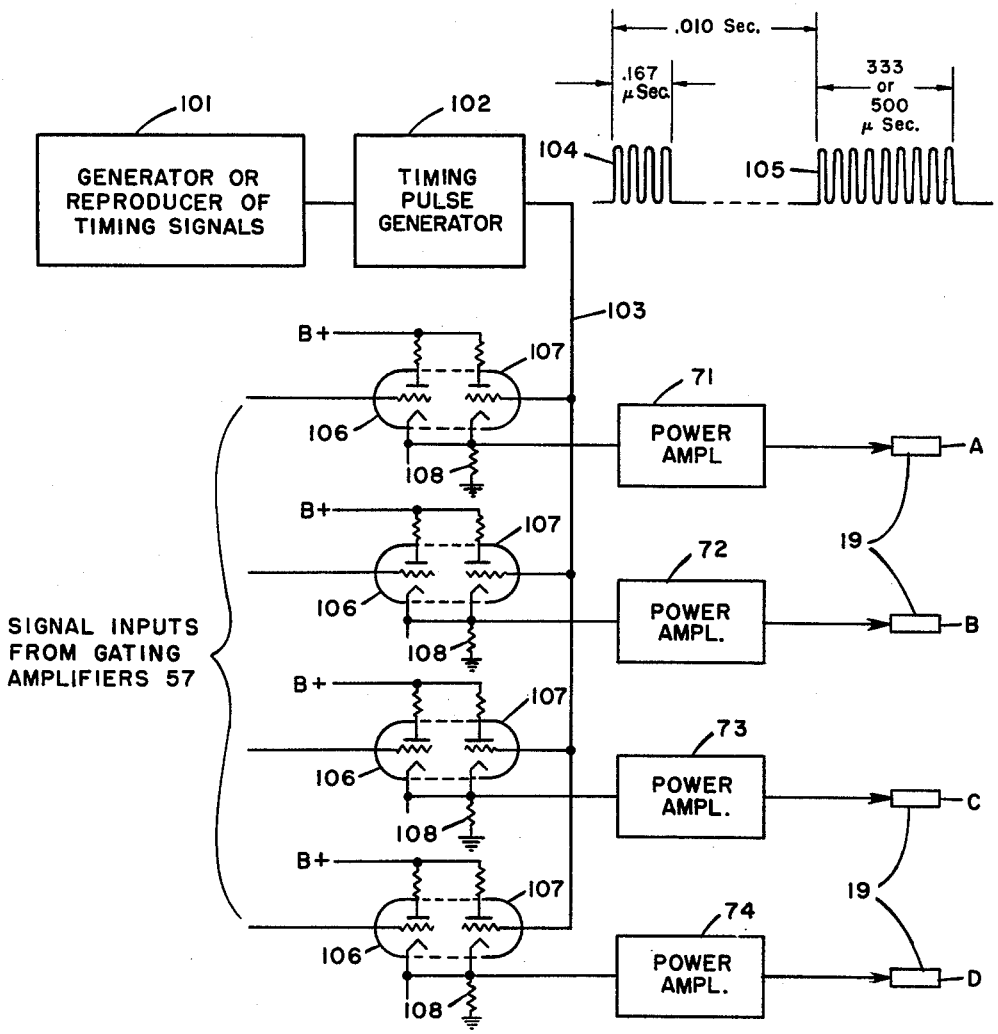
Figure 8:
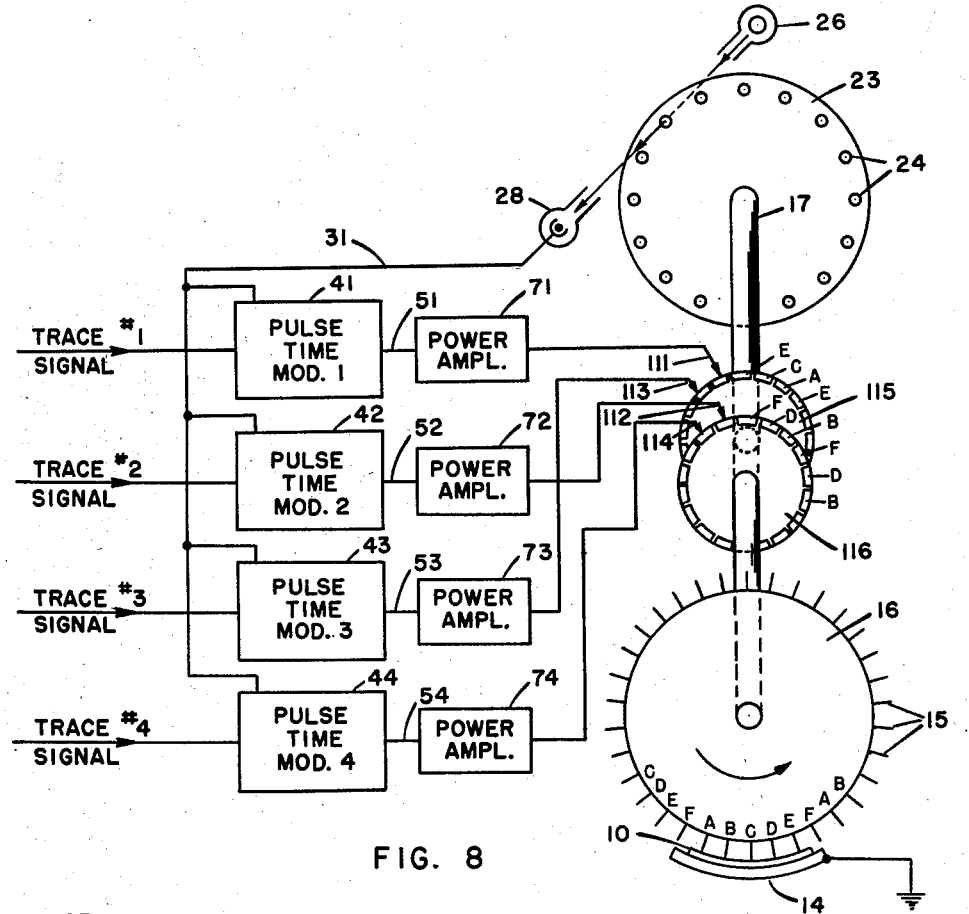
Figure 9:
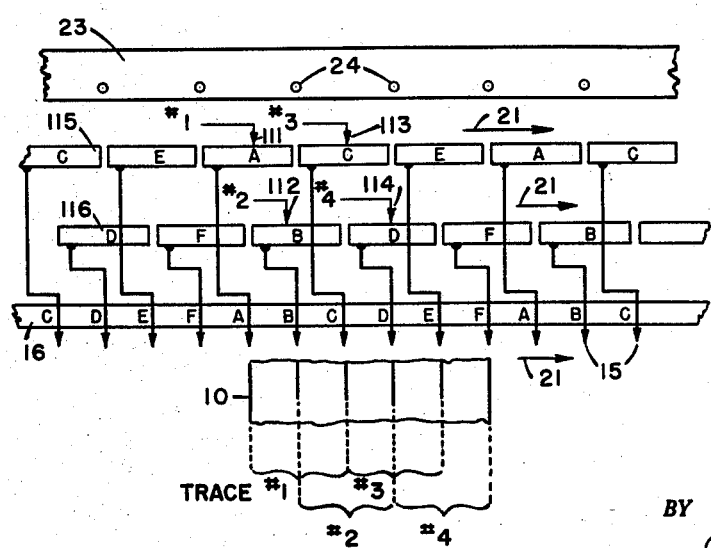
Figure 10:
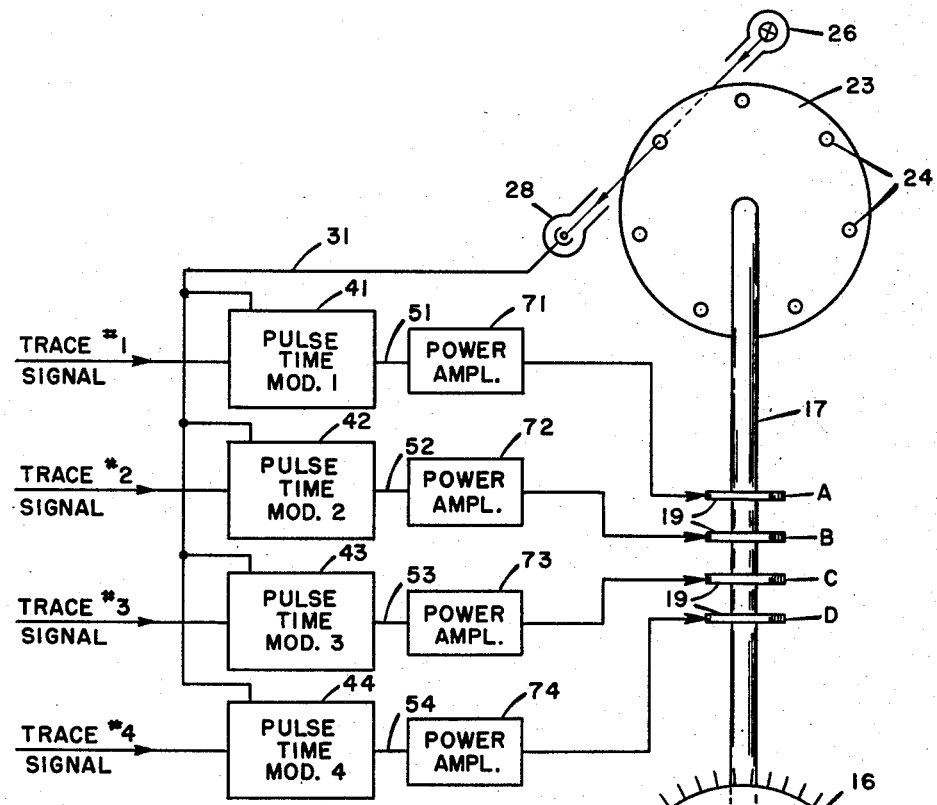
Figure 11:
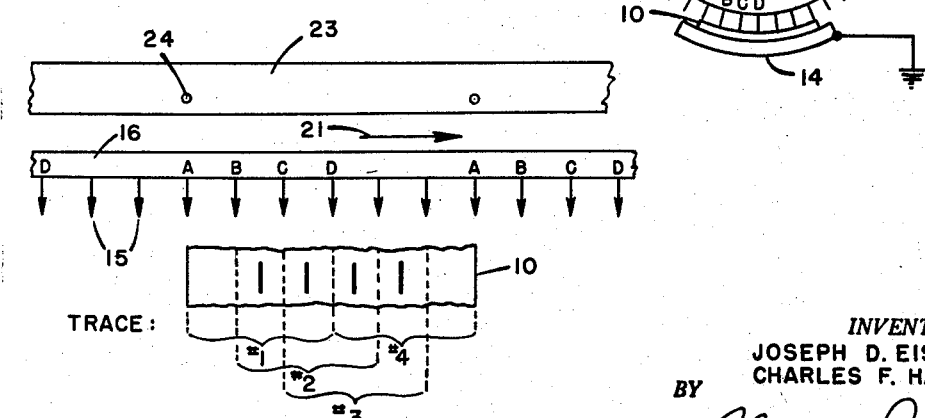

Figures 5 and 6 are diagrammatic views, corresponding respectively to Figures 1 and 2, showing a further embodiment of the invention with a multiplexing arrangement different from Figures 3 and 4;

Figure 7 is a block wiring diagram of circuits for producing timing lines on the record medium;

Figures 8 and 9 are diagrammatic views, corresponding respectively to Figures 1 and 2, of a modification of the invention using commutators; and, Figures 10 and 11 are diagrammatic views, corresponding respectively to Figures 1 and 2, of a simplified version of the invention, wherein the multiplexing feature is omitted.

Referring now to these drawings in detail, Figures 1 and 2 thereof illustrate an embodiment of the invention for simultaneously recording four independent signal traces. A four-trace recorder is shown for ease of explanation, but any greater or less number of traces can be recorded in a similar manner, as will subsequently be made clear. In Figure 1, a record-receiving medium 10 of the electro-sensitive paper type, such as that known by the trade-name Teledeltos, is drawn from a supply spool 11 to a take-up spool 12, which is turned at an appropriate speed by a motor 13. This speed, for example, may be approximately that employed in making photographic seismograph records.

Between the spaced spools 11 and 12, record material 10 passes over a curved metallic backing plate 14 having the same radius of curvature as the curve traced by the tips of a plurality of spaced contactors or styli 15, arranged along the edge of a disc 16 and insulated from each other except for interconnections which will be explained below. By careful adjustment of the clearance between the tips of styli 15 and backing plate 14, definite contact is made by each stylus 15 with the surface of record medium 10 without the pressure being so great as to cause tearing of the paper or marking by frictional effects. The disc 16 is mounted on a shaft 17 which is rotated at a proper speed by a motor 18 energized from any suitable source of power, not shown.

For purposes of illustration, let it be assumed that the styli 15 spaced around the periphery of disc 16 are 4N in number, where N is any integer. Thus, there are N groups of four styli each on disc 16. Starting with any stylus on the disc and proceeding in a counter-clockwise direction, let the styli be designated by the letters A, B, C, and D for a first group; A, B, C, and D for the next adjacent group in the counterclockwise direction; and so on around the disc 16. All of the styli A are connected together and to ring A of a group of slip rings 19 mounted on but insulated from the shaft 17, while styli B, C, and D are similarly interconnected and brought out separately to the corresponding insulated slip rings B, C, and D. By making N larger than one, for example, ten or twenty, the rotational speed of disc 16 is correspondingly reduced for a given peripheral speed.

Referring to Figure 2, a portion of the periphery of disc 16 and some of styli 15 are shown as they would appear if laid out along a straight rather than a curved line. In this figure, immediately below the styli 15 is shown a short length of the record medium 10, similarly laid flat adjacent the styli. At the bottom of the figure, the numbered brackets, taken together with the dotted lines placed on the record medium 10, designate the respectvie spaces allotted for recording each of the traces numbered #1, #2, #3, and #4. The heavy vertical lines in the center of these spaces on record 10 correspond to the position of traces #1, #2, #3, and #4, respectively, when the signal amplitude of each trace is zero.

Assuming now that disc 16 is rotating clockwise, or moving to the left as indicated by arrow 21, and is at the position shown in Figure 2, styli A, B, C, and D are respectively in positions to start recording traces #1, #2, #3, and #4. During the time interval each of styli A, B, C, and D moves across the space allotted for the recording of one trace, an electrical current pulse passes from the tip of each stylus 15 through the record medium 10 to the backing plate 14 at the instant when the stylus 15 reaches the proper position for recording the respective trace. Thus, during the interval of movement of styli A, B, C, and D across one trace width, a current impulse is applied over slip ring A to stylus A to produce the dot marking trace #1, and similar impulses applied through slip rings B, C, and D, respectively to the styli B, C, and D, produce dots indicative of traces #2, #3, and #4.

At the end of this interval, stylus A will be at the left edge of record 10, and styli B, C, and D will be in positions respectively to begin recording traces #1, #2, and #3. The stylus A of the following stylus group is at the right-hand edge of record 10 in a position to begin recording trace #4. At this instant, therefore, the multiplexing circuit switches the signal-pulse-producing circuit for trace #1 to slip ring and stylus B, the pulse-producing circuit for trace #2 to slip ring and stylus C, the pulse circuit for trace #3 to slip ring and stylus D, while the pulse circuit for producing trace #4 is connected to slip ring A. One more dot is accordingly added to each of traces #1, #2, #3, and #4 as each of the styli moves across one trace-receiving space. This multiplexing or commutation of the pulse-producing circuits and dot-producing styli is performed two more times, until the next group of styli A, B, C, and D in the counter-clockwise direction around disc 16 comes into the position shown in Figure 2. The four-interval commutating or multiplexing cycle is then repeated.

As one trace-producing dot is produced each time a stylus 15 moves across the space allotted for the corresponding trace, it is apparent that, if the desired time spacing of successive dots to produce a trace is one-half milli-second (500 microseconds), then the rotational speed of disc 16 need be only sufficient to move the stylus 15 across one trace-receiving space in this time interval. Therefore, only the peripheral speed of disc 16 is of importance, and by constructing disc 16 of sufficient size and using enough groups of styli A, B, C, and D, the necessary rotational speed can be kept down to a practical value.

One means for accomplishing the multiplexing is shown in Figure 1. Mounted on the shaft 17 is a synchronizing disc 23 containing two concentric circular rings 24 and 25 of spaced apertures. Placed on opposite sides of disc 23 respectively in positions to transmit and receive light impulses through apertures 24 are a light source 26 and a photocell 28, while similarly placed with reference to apertures 25 are a light source 27 and photocell 29. As is shown most clearly in Figure 2, the angular spacing of apertures 24 is equal to the angular spacing of styli 15, while the angular spacing of apertures 25 is four times this amount.

By conducting lead 31, impulses from photocell 28 are supplied to each of the four stages of a ring counter 32 having the stages 33, 34, 35, and 36. A coincidence amplifier 37, which is actuated by simultaneous impulses from photocell 28 and from the photocell 29 transmitted over a lead 38, is provided to insure that ring counter 32 begins its operating cycle with the first stage 33. It will be understood that this means the styli of disc 16 and apertures 24 and 25 are so oriented with respect to each other that triggering of counter stage 33 occurs just as stylus A starts to sweep across the space in which trace #1 is to be recorded.

As ring counters are well known in the art, counter 32 will not be described in detail, other than to point out that in operation one stage is "on" while all others are "off." Receipt of each triggering pulse over lead 31 turns the "on" stage off and turns "on" the following stage in the ring, which stage remains "on" until receipt of the next triggering pulse. During the time interval when a counter stage is "on," voltage appears on its output lead and may be used for gating or other purposes. A description of a counter circuit suitable for use in the present invention appears at pages 150–153 of Electronics for April 1946.

Lead 31 from photocell 28 extends also to a plurality of pulse-time modulators 41, 42, 43, and 44, respectively connected to the four signal sources, not shown, which are to be recorded respectively as traces #1, #2, #3, and #4. It is the function of each of modulators 41, 42, 43, and 44 to produce an output pulse, at a time interval after the triggering impulse received over lead 31, which interval depends on the amplitude and polarity of the signal to be recorded as an oscillographic trace. For example, the time interval between the triggering of modulator 41 and the delivery of a current pulse to the modulator output lead 51 is made progressively longer as the signal changes from a large negative amplitude to zero amplitude and then increases to progressively greater positive values.

As a large variety of circuits are known in the art for performing this function, a detailed description of modulator 41 will not be given. A number of such circuits, which perform time modulation by the voltage sawtooth method and are therefore suitable for use in this invention, are described in chapter 13 of Waveforms, by Chance et al., pages 477–491. This book is volume 19 of the Radiation Laboratory Series, published by McGraw-Hill Book Company, Inc.

The signal pulses appearing on the respective output leads 51, 52, 53, and 54 of pulse-time modulators 41, 42, 43, and 44 are applied to the input terminals of four groups of four gating or coincidence amplifiers 57 so arranged that one amplifier of each group is connected to the output lead of one of the stages of ring counter 32. For example, output lead 63 of counter stage 33 is connected to the first gating amplifier 57 of each group, output lead 64 of stage 34 is connected to the second amplifier 57 of each group, lead 65 of stage 35 is connected to the third amplifier of each group, and output lead 66 of stage 36 is connected to the fourth amplifier 57 of each gating amplifier group.

It is the function of each gating amplifier 57 to transmit signal pulses to its output circuit only when both time-modulated pulse and gating voltages are simultaneously applied to it. For either voltage alone, no output signal is produced. Many circuits for doing this are well known in the art, some being described in chapter 10 of Waveforms, mentioned above, particularly at page 378, for example. The output of each group of gating or coincidence amplifiers 57 is connected to the input of one of the power amplifiers 71, 72, 73, and 74, respectively, having the function of amplifying the pulses and regulating their length to produce the desired marking of medium 10. The output of each of the powr amplifiers extends to a brush which contacts one of the slip rings A, B, C, and D.

The operation of these circuits may be better understood by considering the cycle of operation of ring counter 32 to be subdivided into four time intervals designated by numerals I, II, III, and IV. During time interval I, after stage 33 is energized by the photocell impulse on lead 31 transmitted through coincidence amplifier 37, a gating voltage is applied by output lead 63 to the gating terminals of each of the four coincidence amplifiers 57 connected thereto. Only these four amplifiers 57 are able to conduct signal pulses to power amplifiers 71, 72, 73, and 74, all of the other twelve coincidence amplifiers 57 remaining in a cut-off condition so that current pulses cannot be transmitted through them. During time interval I also, each of pulse-time modulators 41, 42, 43, and 44 is passing through a cycle of modulation, so that, after various portions of time interval I have elapsed, a pulse appears on each of output leads 51, 52, 53, and 54 and is transmitted directly to the corresponding one of amplifiers 71, 72, 73, and 74, to appear on one of styli A, B, C, and D, respectively.

During time interval II of ring counter operation, gating voltage is applied over lead 64 to energize the second coincidence amplifier 57 in each of the four groups, so that the signal pulses appearing on leads 51, 52, 53, and 54 are this time respectively transmitted to amplifiers 72, 73, 74, and 71 in that order. Similarly, during ring counter interval III, voltage over lead 65 actuates the third of each of the coincidence amplifiers, and pulses on the leads 51, 52, 53, and 54 appear respectively on amplifiers 73, 74, 71, and 72. During the final interval IV of ring counter operation, the gating voltage on lead 66 directs the pulses from leads 51, 52, 53, and 54 through amplifiers 74, 71, 72, and 73, to brushes D, A, B, and C in that order. As stage 33 of counter 32 is again actuated by the next photocell pulse, this multiplexing or commutating switching sequence is repeated. In this way each stylus 15 on the edge of disc 16 receives a record-dot-producing impulse corresponding to the instantaneous amplitude of the trace to be recorded in the interval of space across which the stylus is then moving.

If the traces to be recorded are $n$ in number ($n$ was equal to four in this example), it will be seen that there are required $n$ pulse-time modulators, $n$ stages for the ring counter 32, $n$ power amplifiers, slip rings, and independent styli 15, and $n$ groups of coincidence amplifiers 57, each group containing $n$ amplifiers. On the synchronizing disc 23, the apertures 25 would be placed opposite every $n$th aperture 24.

In the system described in Figures 1 and 2 each of the traces is allotted a separate space or portion of the width of record 10. If there are many traces, this means either that the maximum amplitude of the traces must be kept small or that a large width of record paper 10 is required. The embodiment of Figures 3 and 4, on the other hand, permits a certain amount of overlapping of adjacent traces in the manner conventional in photographic seismic recording using mirror or string galvanometers.

Thus, as is indicated at the bottom of Figure 4, each of traces #1, #2, #3, and #4 can occupy a space which is equal in width to three times the separation of the traces at zero signal. That is, trace #1 may occupy any point within two-thirds of the space allotted to trace #2 and one-third of the space allotted to the trace #3. Traces #1 and #4, however, are not permitted to overlap. If it is desired to maintain the same spacing in time between successive trace-producing impulses, it is necessary that the peripheral speed of disc 16 be three times as great as was required in the embodiment of Figure 1. This, however, is not a difficult requirement to meet, as it can be achieved partially or entirely by increasing the disc diameter, without requiring too high a rotational speed of shaft 17.

As is shown in Figure 3, this embodiment requires, in each set or group of styli 15, two more styli than in the four-trace recorder of Figure 1. Likewise, there are required two corresponding additional slip rings 19 and power amplifiers. Thus, there are, in addition to the styli A, B, C, and D, two styli E and F and two corresponding slip rings E and F, together with power amplifiers 75 and 76 furnishing record-producing current impulses.

The electronic multiplexing system, however, is considerably simplified, to the extent that only two stages 33 and 34 of the ring counter 32 are necessary. Although the spacing of styli 15 on the edge of disc 16 is the same as in Figure 1, the angular spacing of apertures 24 on synchronizing disc 23 is three times that of Figure 1, while the angular spacing of apertures 25 is equal to the angular width of record 10. This last was true also of the apertures 25 in Figure 2, but there record 10 was effectively narrower because the maximum recordable amplitude of each of the traces was only one-third as great as in Figure 4, where additional space along the edges of the record is necessary to record large deflections of traces #1 and #4.

In operation, during time interval I when stage 33 of counter 32 applies gating voltage over lead 63, signal pulses on leads 51, 52, 53, and 54 are respectively applied to amplifiers 71, 72, 73, and 74 to be recorded by styli A, B, C, and D. During the alternate time interval II, when counter stage 34 energizes lead 64, the signal pulses on leads 51, 52, 53, and 54 respectively are applied to amplifiers 74, 75, 76, and 71, to be recorded by styli D, E, F, and A. Since, at the end of this time interval, the styli 15 will again be in the position shown in Figure 4, stage 33 is again actuated to repeat the two-interval operation of counter 32.

In the general form of this embodiment for recording $n$ traces with overlap between traces, the number of counter stages for ring counter 32 and the number of styli 15 per group can be determined in the following manner: Let $s$ be the space between traces of zero amplitude. Then, for overlapping traces, let $k=ms$, where $m$ is any integer and $k$ is the width of the space allotted for recording each trace. For the foregoing example, therefore, $m=3$, meaning that the total space $k$ available for each trace is equal to three times the spacing $s$ between traces. For $n$ traces the number of counter stages $c$ is given by the equation $$c = \frac{n+m-1}{m}$$

or the next higher integer, where $$\frac{n+m-1}{m}$$

is a non-integer or mixed number. The number of styli per group or set is then given by the product $mc$. Thus, applying this relation to a recorder for twelve traces, $n=12$; and allowing the same trace amplitude and overlap as in the four-trace recorder described above, $m=3$; the number of counter stages $c=4\frac{2}{3}$; or, since this is a mixed number, the next higher integer must be chosen, so that $c=5$. The number of styli per group, therefore, is given by the product $mc$, or $3 \times 5$, which is fifteen.

Also, for a twelve-trace recorder it will be understood that twelve pulse-time modulators 41 are required, as well as fifteen power amplifiers 71 and slip rings 19. The number of coincidence or gating amplifiers 57 is given by the product $cn$ and is therefore sixty for $c=5$ and $n=12$. The angular spacing of apertures 24 is the same as shown in Figure 4, but the angular spacing of apertures 25 is fifteen trace spaces $s$ instead of $6s$ as in Figure 4.

In Figures 5 and 6 is illustrated an alternative embodiment of the invention, similar to that of Figures 3 and 4 in that overlap of the traces is permitted. This embodiment is considerably simpler mechanically in that, for a four-trace recorder, only two styli 15 (A and B) on the disc 16 are in use at any given time. The electronic multiplexing or switching arrangement, however, is somewhat more complex than that of Figure 3.

Thus, assuming the same spacing of traces and overlap as in Figure 4, that is, $m=3$, the two styli 15, A and B, forming a set or group are separated by a spacing three times their separation in Figure 4. The apertures 24 on synchronizing disc 23, however, are separated by only one-third of the spacing shown in Figure 4, whereas the separation of apertures 25 in Figure 6 is equal to the stylus separation in this figure. The rotational speed of discs 16 and 23 is the same as in Figure 4 so that, if the record-dot spacing is to be 500 microseconds, then photocell 29 receives a light impulse every 500 microseconds. The light impulses received by photocell 28 are at about one-third of this time spacing, namely, about 167 microseconds apart.

The triggering of time-pulse modulators 41, 42, 43, and 44 is different here from the arrangement shown in Figures 1 and 3. Ring counter 32 has the three stages 33, 34, and 35, and pulse-time modulators 41 and 44 are simultaneously triggered by the appearance of gating voltage on counter stage output lead 63. Pulse-time modulator 43 is triggered similarly, after a delay of about 167 microseconds, by the gating voltage appearing on lead 64; and pulse-time modulator 42 is similarly triggered after a further delay of about 167 microseconds by gating voltage appearing on lead 65. Each of pulse-time modulators 41, 42, 43, and 44, however, utilizes approximately 500 microseconds for one cycle of modulation. An output impulse, therefore, appears on lead 51, 52, 53, or 54 at a time within this 500-microsecond cycle depending on the input signal polarity and amplitude.

An additional ring counter 82, consisting of the two stages 83 and 84 actuated by impulses from photocell 29, is employed in this embodiment. On disc 23 is a third ring of apertures 85, correlated in angular position with the A styli of disc 16 as shown in Figure 6, which apertures pass light impulses from a light source 86 to a photocell 88. The resultant electrical impulses are applied by a lead 89 to a coincidence amplifier 87 at the input of stage 83 to insure that it triggers at the beginning of a commutating cycle, rather than stage 84. Similarly, the impulses from photocell 29, applied over lead 38 to amplifier 37 as in the previous embodiments, initiate the cycling of counter 32 with stage 33, in synchronism with the triggering of stages 83 and 84.

The operation of this embodiment can be understood by considering the triggering of stage 83 of counter 82 and stage 33 of counter 32 to occur when the styli A and B are in the position shown in Figure 6. During time interval I, which is about 500 microseconds in length, stylus A moves from the center of record strip 10 to the left edge, while stylus B moves from the right-hand edge to the center. During this time the output lead 93 of stage 83 energizes the coincidence amplifiers 57 connected thereto, so that pulses appearing on lead 80 are transmitted to amplifier 71 and thence to slip ring and stylus A, while pulses appearing on lead 81 are transmitted to amplifier 72 and to slip ring and stylus B.

The 500-microsecond cycle of pulse-time modulators 41 and 44 begins at this instant. At this instant also, pulse-time modulator 43 has 167 microseconds remaining of its previous cycle, and pulse-time modulator 42 similarly has 333 microseconds of its previous cycle remaining. Accordingly, if pulses appear on leads 51, 52, and 53 during the 167 microseconds that gating voltage is present on lead 63, these pulses are transmitted to lead 80 and recorded by stylus A. Pulses on lead 54 are transmitted through lead 81 to stylus B.

During the next 167 microseconds, when gating voltage is present on lead 64, pulses on leads 51 and 52 are transmitted to lead 80, while pulses on leads 53 and 54 go to lead 81. In the final 167 microseconds of time interval I, when gating voltage is on lead 65, pulses on lead 51 alone appear on lead 80, while pulses appearing on leads 52, 53, and 54 travel to lead 81. This completes the operations occurring during time interval I.

Ring counter 32 repeats the same events upon the triggering of stage 84 to start the 500-microsecond time interval II. Pulses from the various pulse-time modulators are directed in the same way to leads 80 and 81, but gating voltage on lead 94 during this time interval reverses the styli A and B, so that pulses from lead 80 are transmitted to stylus B, and those from lead 81 appear on stylus A. The commutating cycle is complete at the end of time interval II, and the photocell impulse actuating stage 83 accordingly begins a new commutating cycle wherein all of the foregoing events are repeated.

In the generalized version of this embodiment for recording $n$ traces, with a maximum possible amplitude $k$ for each trace of $m$ units of the inter-trace spacing $s$, the number of stages in ring counter 32 is equal to $m$, and the stages $c$ required for counter 82 are given by the equation $$c = \frac{n+m-1}{m}$$

or the next higher integer, where the quotient is a mixed number. This is the same as the number of counter stages $c$ of Figure 3, but, unlike Figure 3, is also the number of slip rings 19 and styli 15 per set required on disc 16. On disc 23, the spacing of apertures 24 is $$\frac{1}{m}$$

of the spacing of apertures 25, which latter spacing is equal to the angular spacing of styli 15.

A twelve-trace recorder, for example, having the same trace amplitude and overlap as the four-trace recorder just described, would therefore employ three stages of ring counter 32 and five stages of counter 82, together with five styli 15 per group (A, B, C, D, and E) on disc 16. The mechanical complexity is thus somewhat reduced as compared with the Figure 3 embodiment, with the additional complication, however, that a record-producing pulse may coincide with the switching of a pulse-time modulator output from one stylus 15 to another by the multiplexing circuits. As the time for multiplexing can be made a very short portion of the modulation-cycle time, however, and can furthermore be kept shorter than the pulse duration when current is passing from one of styli 15 to backing plate 14, the possibility that one trace-producing dot may occasionally not be recorded is very small.

As seismic recordings normally also include timing lines by which the time interval between recorded events can be ascertained, one means for producing such lines is illustrated in Figure 7. A timing signal in the form of regularly spaced electrical pulses is provided by a generator 101, which may be either the regular timing-signal source, such as a tuning fork used in making field recordings, or may be a reproducing device responding to a previously recorded timing trace, in case records are being made from a reproducible record medium. The output of generator 101 preferably modulates a timing pulse generator 102 which may contain an oscillator of, say, 40 kilocycles frequency to give on output lead 103 short bursts or trains of 40 kc. pulses spaced exactly 10 milliseconds apart. The minimum duration of these pulse trains corresponds approximately to the travel time of any given stylus 15 through the stylus spacing distance. For example, with a dot spacing of ½ millisecond (500 microseconds) in the overlapping-trace embodiment of Figures 3 and 4, the narrowest timing line would be produced by a pulse train 104 of about 167 microseconds length. This corresponds to one pass by one stylus 15 through the inter-trace spacing $s$.

Emphasis of certain timing lines, such as every fifth and tenth line, is provided by a longer pulse train 105 of 333 or 500 microseconds length, for example, to give two or three successive passes across the space $s$. This makes the emphasized lines appear thicker and heavier. Their accuracy is not impaired, however, as the leading edges of all lines are exactly 10 milliseconds apart.

The pulse trains on lead 103 are coupled, through unidirectional devices which prevent cross feed between traces, to all of the amplifiers 71–74 simultaneously. Typically these unidirectional devices comprise dual-triode vacuum tubes having half sections 106 and 107 connected in a dual cathode follower circuit. The various signal pulses from gating amplifiers 57 applied to the grids of triodes 106 and the timing-line pulse trains applied to the grids of triodes 107 then appear across the cathode resistors 108 and are transmitted to the amplifiers 71–74 and slip rings 19 without mutual interference.

As will be apparent, the timing lines drawn across record medium 10 by energizing all styli 15 simultaneously will be continuous lines of closely-spaced dots except for the small forward travel of record medium 10 in the 500 (or less) microseconds' duration of the timing pulse trains. As a practical matter, this "shingling" effect is hardly noticeable. Also, it should be understood that pulses 104 and 105 could be direct-current pulses of corresponding length, rather than carrier-modulated pulses as shown, provided amplifiers 71–74 are designed to transmit such elongated pulses.

It should be emphasized that the foregoing embodiments and modifications of the invention are particularly adapted for recording at speeds that are quite high, as compared with the capabilities of pen recorders, for example. Frequencies of several hundred cycles per second can be recorded with good fidelity and detail. While, at the highest speeds, multiplexing of the various record-dot-producing impulses to successive styli 15 is most effectively done by the electronic circuits which have been described, it can also be done by an arrangement of one or more commutators, as shown in Figures 8 and 9. Especially is this true for lower disc speeds and lower signal frequencies.

Thus, as appears in Figure 8, the respective pulse-time modulator outputs present on leads 51–54 are taken directly to amplifiers 71–74, where they are brought to the proper power level and pulse length for satisfactory record marking. The outputs of amplifiers 71, 72, 73, and 74 are respectively applied to stationary commutator brushes 111, 112, 113, and 114. Brushes 111 and 113 make contact with successive segments of a first commutator ring 115, while brushes 112 and 114 similarly contact segments of a second commutator ring 116, both commutators being mounted on and rotated by the shaft 17.

As is better shown in Figure 9, each commutator bar or segment is connected to a correspondingly lettered stylus 15 on disc 16. For making a four-trace record with the trace overlap shown in Figure 9, where each trace is allotted about two inter-trace spaces $s$, six styli 15, designated A to F, are needed, per set. Styli A, C, and E, are connected to successive bars of the commutator 115, while the alternate styli B, D, and F, are similarly connected to adjacent segments of commutator 116. The angular length of each commutator segment, neglecting the small thickness of electrical insulation in the gap between adjacent segments, is equal to the maximum possible trace excursion, or $2s$ here.

The angular spacing of apertures 24 on synchronizing disc 23 is also equal to the angular length of the commutator segments, and the disc is so oriented that triggering of the pulse-time modulators occurs as nearly as possible at the instant when contact is first made between each brush and each commutator segment. It is, of course, understood that brushes 111, 112, 113, and 114 are positioned or adjusted so as to contact the various commutator bars as nearly simultaneous as possible. Each modulation cycle has a maximum length equal to the travel time of any commutator segment past any contact brush. Preferably the modulation cycle is made slightly shorter than this maximum, so that no marking impulse will occur when a brush is in contact with the insulation between segments.

The operation is believed apparent from inspection of Fig. 9. Trace #1, for example, is made by successive dots from styli A, E, and C, as the corresponding commutator segments move past brush 111 in that order, as indicated by arrow 21. Simultaneously, trace #2, is being formed by styli B, F, and D; trace #3 by styli C, A, and E; and trace #4 by styli D, B, and F. This action of commutators 115 and 116 is in practically all respects analogous to the ring counter 32 and gating amplifiers 57 of Figure 3.

For some purposes, the high dot-repetition rate obtainable by multiplexing at moderate disc rotational speeds is not required. As a field monitoring device in seismic surveying, for example, a simplified version of the invention omitting the multiplexing feature will indicate the general form of the received signals and show whether the primary detecting, amplifying, and recording elements are functioning properly. Also, signals that vary relatively slowly with time, as in well logging, can be recorded with high fidelity on a slowly moving record medium.

Thus, as is shown in Figures 10 and 11, the outputs of the respective amplifiers 71, 72, 73, and 74 can be transmitted directly via slip rings 19 to the styli A, B, C, and D. The various groups or sets of four styli 15 in use and designated A, B, C, and D, must be separated by enough unused styli or corresponding spaces, so that each stylus in use contacts record strip 10 only once for each modulation cycle. In other words, as is evident in Figure 11, the styli in use plus those not used or omitted must be able to span the width of strip 10. Generalizing, for recording $n$ traces in spaces $m$ inter-trace units wide, $n$ active styli and $m-1$ inactive styli or corresponding spaces per group are needed.

The angular spacing of apertures 24 on synchronizing disc 23 is the same as the regular spacing of the A styli of disc 16, which is also the angular span of the record strip 10. The modulation-cycle duration of modulators 41—44 is preferably about equal to the time of movement of any stylus 15 on disc 16 through $m$ inter-trace spaces.

As compared with the electronic multiplexing embodiments this simplified embodiment of the invention substantially reduces the circuit complexity and power requirements, which are two aspects of importance, especially for portable equipment.

While our invention has thus been described in terms of the foregoing specific embodiments, it is to be understood that still further modifications will be apparent to those skilled in the art. The scope of the invention, therefore, should not be considered as limited to the embodiments described but is properly to be ascertained from the appended claims.

We claim:

1. An inkless multiple-trace recorder comprising a rotatable member and means for rotating said member, a plurality of evenly spaced styli carried by said member and movable thereby in a single circular path, means for curving an electro-sensitive record strip into a position to be lightly contacted by each of said styli throughout a substantial portion of said path, said strip providing a plurality of parallel trace-receiving spaces and the spacing of said styli on said member being less than the width of said strip, whereby a plurality of said styli contact said strip simultaneously, means for moving said strip lengthwise and perpendicular to said path, means synchronized with the rotation of said member to pass a mark-producing impulse of electric current from each of said styli through said strip when said each of said styli reaches a position within a trace-receiving space on said strip corresponding to the instantaneous amplitude of a signal to be recorded in said space, and multiplexing switch means for transmitting subsequent mark-producing impulses through the appropriate ones of said styli subsequently moving across each trace-receiving space of said strip, whereby at least some of said styli produce marks in more than one trace-receiving space in each pass across said strip.

2. An inkless multiple-trace recorder comprising a rotatable member and means for rotating said member, a plurality of evenly spaced styli carried by said member and movable thereby in a single circular path, means for curving an electro-sensitive record strip into a position to be lightly contacted by each of said styli throughout a substantial portion of said path, said strip providing a plurality of parallel trace-receiving spaces and the spacing of said styli on said member being less than the width of said strip, whereby a plurality of said styli contact said strip simultaneously, means for moving said strip lengthwise and perpendicular to said path, means synchronized with the rotation of said member to pass a mark-producing impulse of electric current from each of said styli through said strip when said each of said styli reaches a position within a trace-receiving space on said strip corresponding to the instantaneous amplitude of a signal to be recorded in said space, and multiplexing switch means for transmitting subsequent mark-producing impulses through the appropriate ones of said styli subsequently moving across each trace-receiving space of said strip, whereby at least one of said styli produce marks in more than one trace-receiving space in each pass across said strip, said multiplexing switch means comprising a number of commutator rings rotatable in synchronism with said styli and equal in number to the number of inter-trace spaces making up each of said trace-receiving spaces, and a plurality of stationary brushes, there being one of for each signal trace in contact with an appropriate segment of said commutator rings throughout the time of movement of each stylus across a trace-receiving space of said strip.

3. An inkless multiple-trace recorder comprising a rotatable disc, means for rotating said disc, a plurality of radial styli uniformly spaced around the periphery of said disc, means for moving an electro-sensitive record strip past said styli in a direction substantially parallel to the axis of disc rotation, means including a curved, electrically-conducting backing plate for curving said moving strip into an arc such that the tips of said styli can maintain contact with the face of said strip as each of said styli sweeps across said strip in the direction of its width, a plurality of pulse-time modulators each connected to a signal source which is to be recorded as an oscillographic trace, each of said modulators being adapted to produce an electrical output pulse at a variable time interval after triggering depending on the variation of the signal received from the corresponding source, means for triggering each of said modulators in synchronism with the rotation of said disc, and multiplexing switch means actuated by said triggering means for transmitting a record-dot-producing impulse from the output of each of said modulators to the one of said styli then moving across the space on said record strip allotted for recording of the trace corresponding to the modulator input signal, whereby a dot-producing impulse of electrical current passes from said one stylus through said strip to said backing plate at a position on said strip corresponding to the instantaneous trace amplitude, said multiplexing means shifting the connection from each modulator output to successive ones of said styli as they move across the corresponding trace-receiving spaces of said strip.

4. A recorder according to claim 3 wherein said triggering means triggers all of said pulse-time modulators simultaneously, and said multiplexing switch means connects each modulator to each stylus in turn as said stylus reaches the edge of the trace-receiving space on said strip corresponding to the modulator input signal, whereby each trace is recorded on a separate space, without overlapping adjacent traces.

5. A recorder according to claim 3 wherein said triggering means triggers all of said pulse-time modulators simultaneously, and said multiplexing switch means connects each modulator to only that stylus located at the edge of the corresponding trace-receiving space at the instant of triggering, whereby overlapping of adjacent traces may occur when the time interval between successive triggerings is greater than the travel time of a stylus across a trace-separation distance.

6. A recorder according to claim 3 wherein said triggering means triggers said pulse-time modulators in a time sequence, and said multiplexing switch means simultaneously maintains connected to each stylus all of the pulse-time modulators capable of recording a trace at the instantaneous position then occupied by the stylus, whereby overlapping of adjacent traces may occur and each trace may have a larger amplitude than the trace separation distance.

7. A recorder according to claim 3 including also a source of timing current impulses accurately spaced at known time intervals and each of a duration about squal to the travel time of one of said styli across an integral number of inter-trace spaces of said record strip, and means for transmitting said timing current impulses to all of said styli simultaneously.

References Cited in the file of this patent

UNITED STATES PATENTS

| | | |
|---|---|---|
| 2,127,331 | Fulton | Aug. 16, 1938 |
| 2,437,242 | Cole et al. | Mar. 9, 1948 |
| 2,579,852 | Olson | Dec. 25, 1951 |
| 2,625,458 | Ruhland | Jan. 13, 1953 |
| 2,639,965 | Holcomb | May 26, 1953 |
| 2,708,615 | Greenleaf et al. | May 17, 1955 |
| 2,742,605 | McMillan | Apr. 17, 1956 |